United States Patent
Lien et al.

(10) Patent No.: US 12,491,536 B2
(45) Date of Patent: Dec. 9, 2025

(54) SEMICONDUCTOR DEVICE AND METHOD OF MANUFACTURING SAME

(71) Applicant: Taiwan Semiconductor Manufacturing Company, Hsinchu (TW)

(72) Inventors: Kang-Yi Lien, Tainan (TW); Kuan-Chi Tsai, Kaohsiung (TW); Yi-Chieh Huang, Tainan (TW); Wei-Tung Huang, Tainan (TW); Hsiang-Fu Chen, Zhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 637 days.

(21) Appl. No.: 17/667,096

(22) Filed: Feb. 8, 2022

(65) Prior Publication Data

US 2023/0036136 A1 Feb. 2, 2023

Related U.S. Application Data

(60) Provisional application No. 63/227,565, filed on Jul. 30, 2021.

(51) Int. Cl.
*B06B 1/02* (2006.01)
*B81B 7/00* (2006.01)
*B81C 1/00* (2006.01)

(52) U.S. Cl.
CPC .......... *B06B 1/0292* (2013.01); *B81B 7/0016* (2013.01); *B81C 1/00825* (2013.01); *B81B 2201/0271* (2013.01); *B81B 2203/0127* (2013.01); *B81B 2203/04* (2013.01); *B81B 2207/012* (2013.01); *B81C 2203/036* (2013.01); *B81C 2203/0792* (2013.01)

(58) Field of Classification Search
CPC .......... B06B 1/0292; B81B 2201/0271; B81B 2203/0127; B81B 7/0016; B81C 1/00825; B81C 1/00182
See application file for complete search history.

(56) References Cited

U.S. PATENT DOCUMENTS

2014/0264660 A1* 9/2014 Rothberg ................ B81B 7/007
438/51
2018/0221917 A1* 8/2018 Maruyama ............ B06B 1/0292
2020/0407220 A1* 12/2020 Lin ........................ B06B 1/0292

* cited by examiner

*Primary Examiner* — Steven B Gauthier
*Assistant Examiner* — Sun Mi Kim King
(74) *Attorney, Agent, or Firm* — Lippes Mathias LLP (57) ABSTRACT

A semiconductor device and method of manufacturing the device that includes a capacitive micromachined ultrasonic transducer (CMUT). The CMUT includes an integrated circuit substrate, and a sensing electrode positioned on the integrated substrate. The sensing electrode includes a sidewall that forms a wall of an isolation trench adjacent to the sensing electrode, and is patterned before covering dielectric layers are deposited. After patterning of the sensing electrode, one or more dielectric layers are patterned, with one dielectric layer patterned on the sensing electrode and sidewall, and which has a thickness corresponding to the surface roughness of the sensing electrode. The CMUT further includes a membrane positioned above the sensing electrode forming a cavity therein.

12 Claims, 12 Drawing Sheets

SEMICONDUCTOR DEVICE AND METHOD OF MANUFACTURING SAME

PRIORITY CLAIM AND CROSS-REFERENCE

This application claims the benefit of U.S. Provisional Application Ser. No. 63/227,565 filed Jul. 30, 2021 and titled CMUT BOTTOM ELECTRODE PROTECTION FOR RELIABILITY IMPROVEMENT. U.S. Provisional Application Ser. No. 63/227,565 filed Jul. 30, 2021 and titled CMUT BOTTOM ELECTRODE PROTECTION FOR RELIABILITY IMPROVEMENT is incorporated herein by reference in its entirety.

BACKGROUND

Micro-electro-mechanical systems (MEMS) is a technology that employs miniature mechanical and electro-mechanical elements (e.g., devices or structures) on an integrated chip. Utilizing micro-fabrication techniques, MEMS devices may range from relatively simple structures with no moving elements, to complex electro-mechanical systems utilizing a variety of moving elements under the control of an integrated microelectronic controller. The devices or structures that are used in MEMS include microsensors, micro-actuators, microelectronics, and microstructures. MEMS devices may be used in a wide range of applications, including, for example and without limitation, motion sensors, pressure sensors, inertial sensors, micro-fluidic devices (e.g., valves, pumps, nozzle controls), optical devices, imaging devices (e.g., micromachined ultrasonic transducers ("MUT"s)), capacitive MUT ("CMUT") ultrasound transducers, and the like.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Numerical values in the specification and claims of this application should be understood to include numerical values which are the same when reduced to the same number of significant figures and numerical values which differ from the stated value by less than the experimental error of conventional measurement technique of the type described in the present application to determine the value. All ranges disclosed herein are inclusive of the recited endpoint.

The term "about" can be used to include any numerical value that can vary without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

In some embodiments, a semiconductor device (e.g., integrated chip) comprises a microelectromechanical systems (MEMS) device. The MEMS device comprises a cavity and a movable membrane. The configuration (e.g., structural configuration) of the MEMS device is dependent on the type of MEMS device. The present disclosure discusses structures and fabrication methods of a capacitive MUT (CMUT). The CMUT device is widely used in high-resolution applications. Current production of CMUTs utilizes a "patterning last" process, wherein the bottom electrode and dielectric film are patterned at the same time, i.e., the bottom electrode and dielectric film pattern are etched at the same time. This patterning last approach may result in exposure of the bottom electrode, particularly along the corner/sidewall of the bottom electrode. The "patterning last" process thus can present a high risk of sidewall or corner metal exposure, for example during chemical-mechanical polishing (CMP). This in turn can lead to high charging and premature breakdown and CMUT failure, especially during high voltage and/or high frequency operation. Embodiments disclosed herein employ a different, "pattern first" process that mitigates these problems.

Figure 1A:
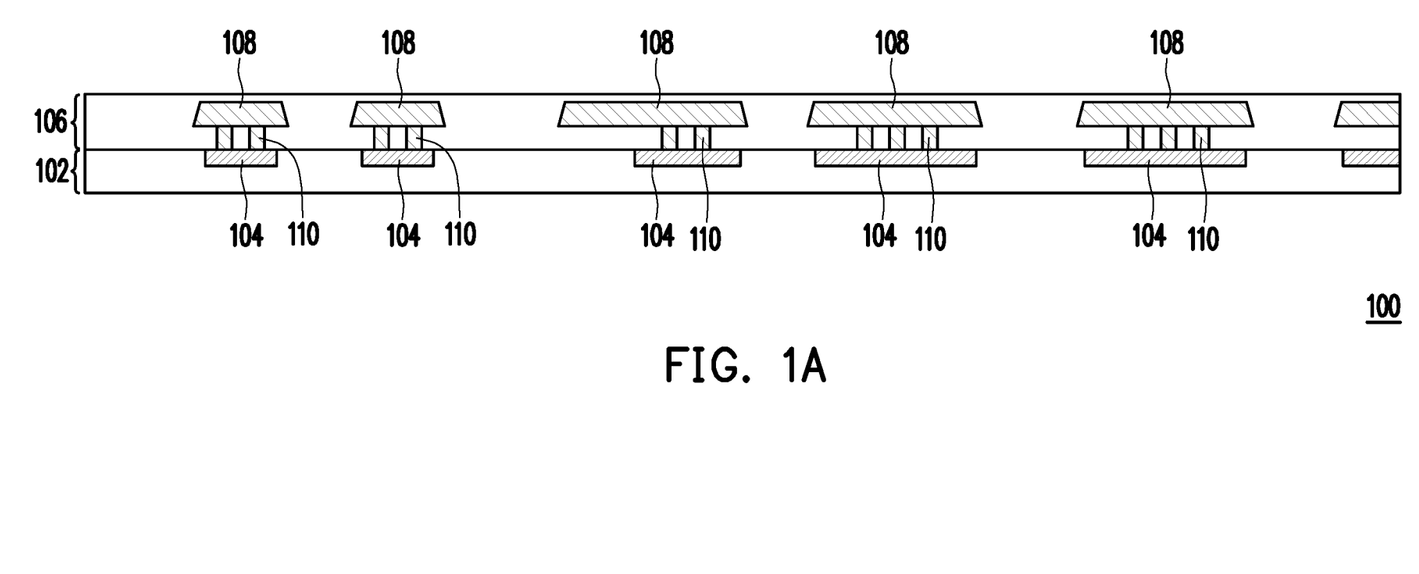
FIGS. 1A-1G illustrate cross-sectional views of some steps for forming a CMUT unit, in accordance with some embodiments.
Figure 1B:
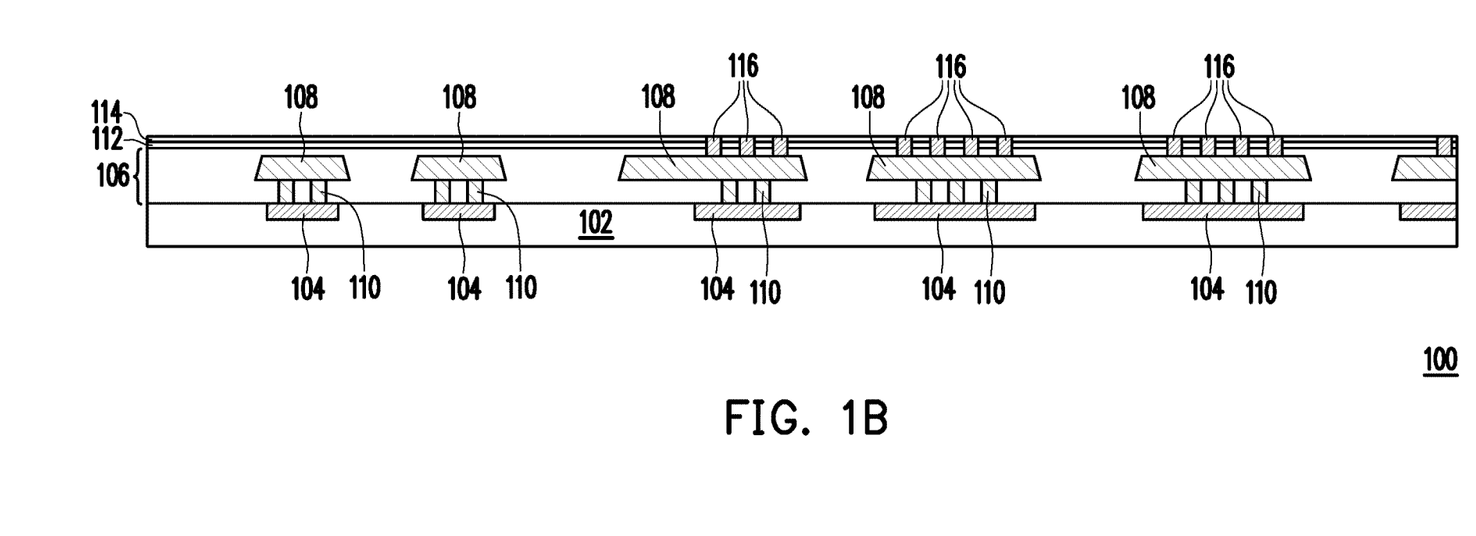
Figure 1C:
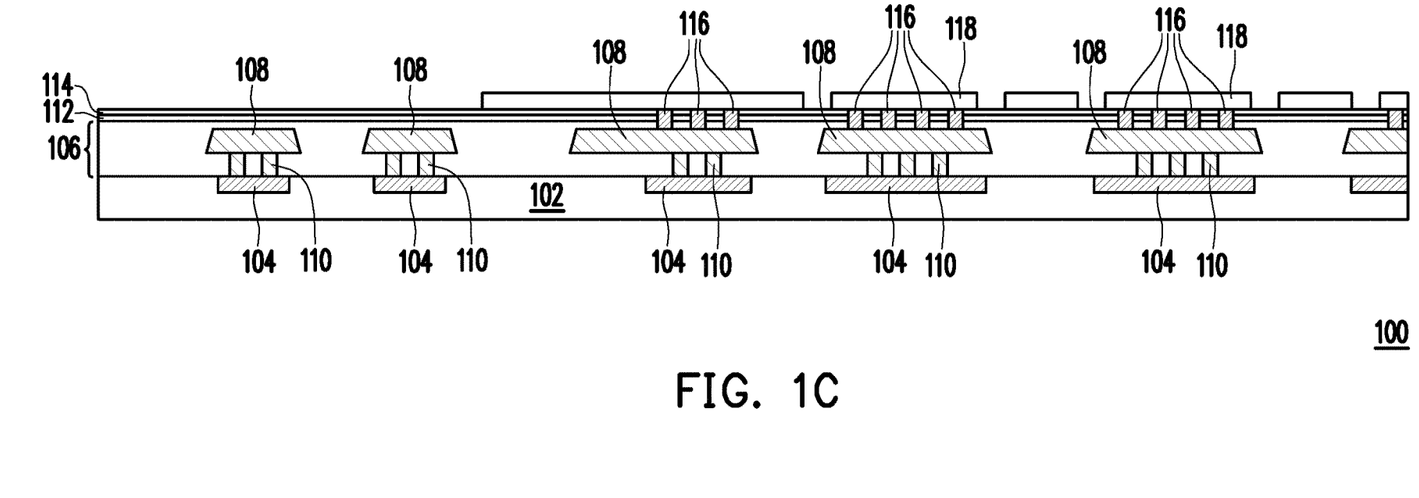
Figure 1D:
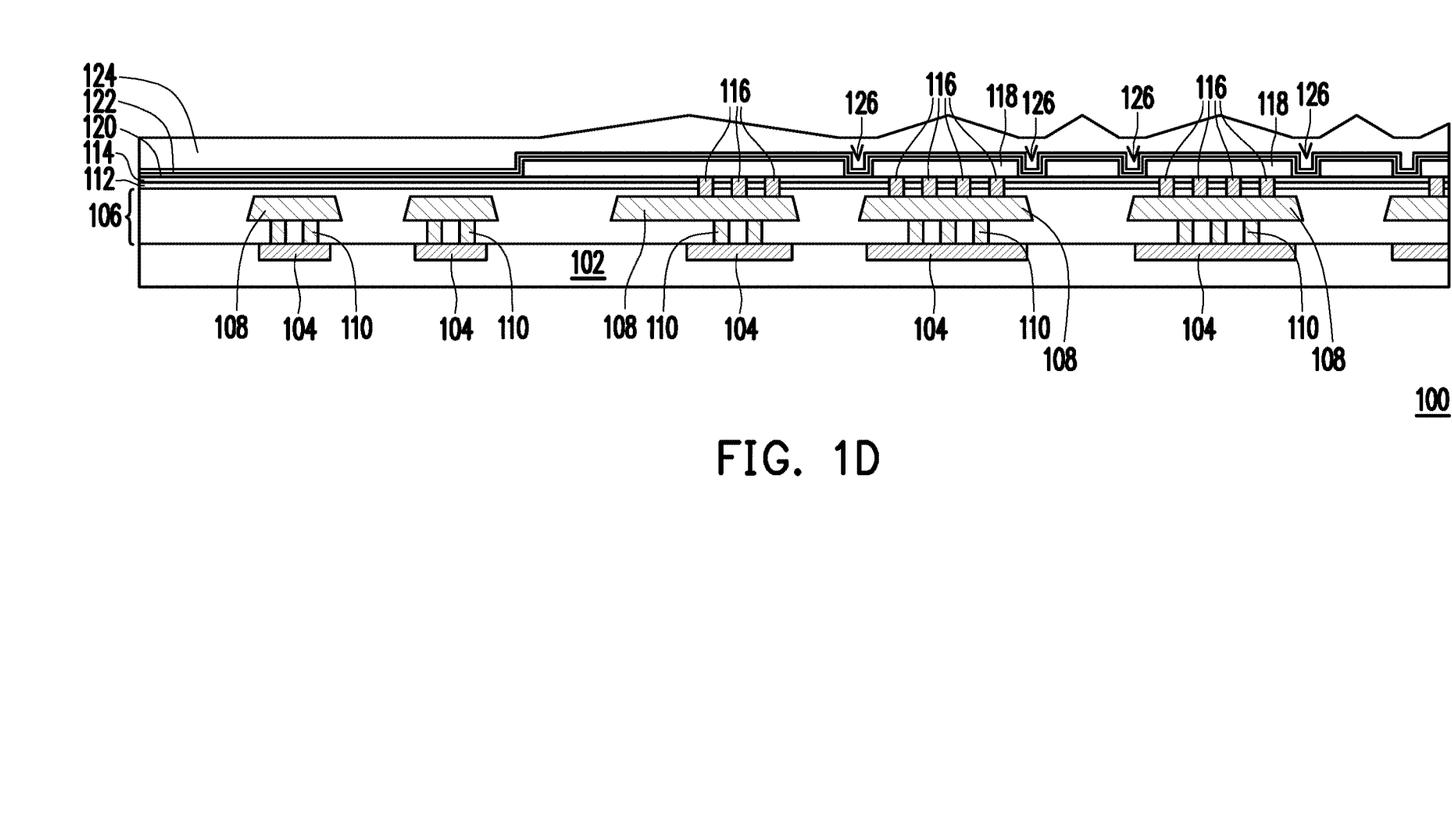
Figure 1E:
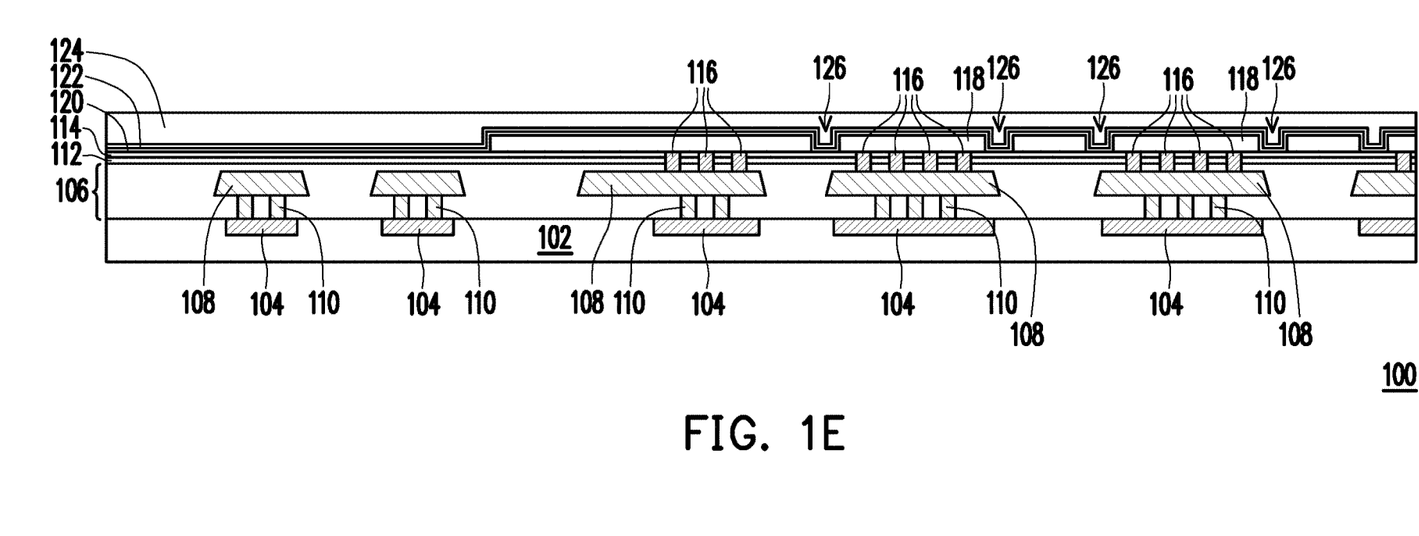
Figure 1F:
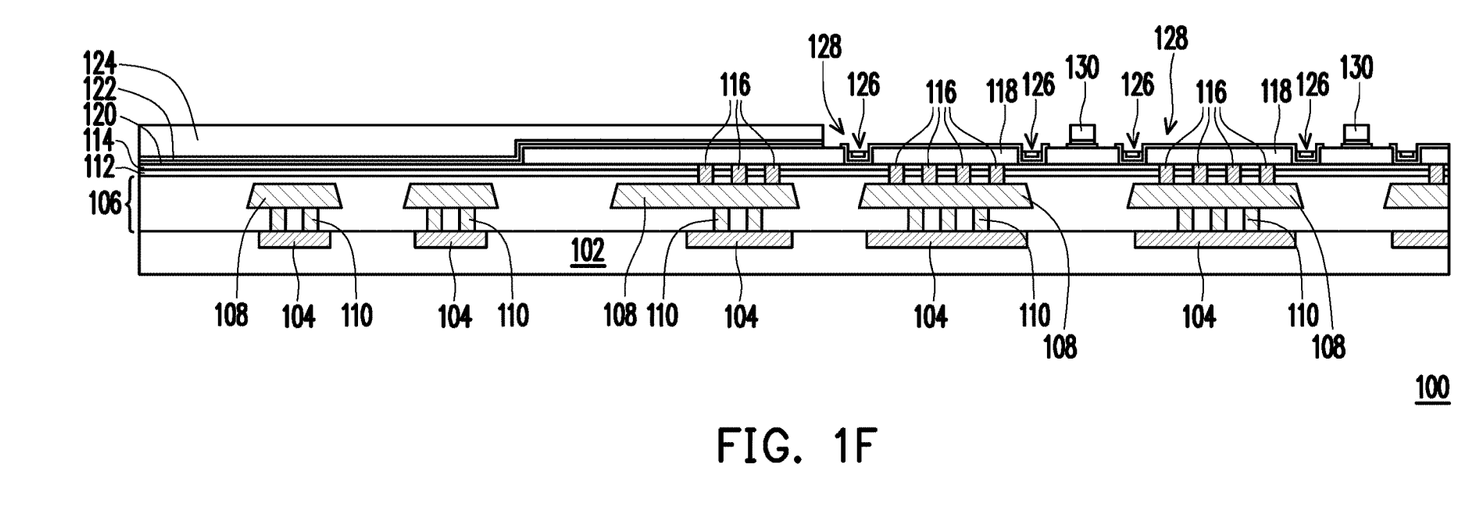
Figure 1G:
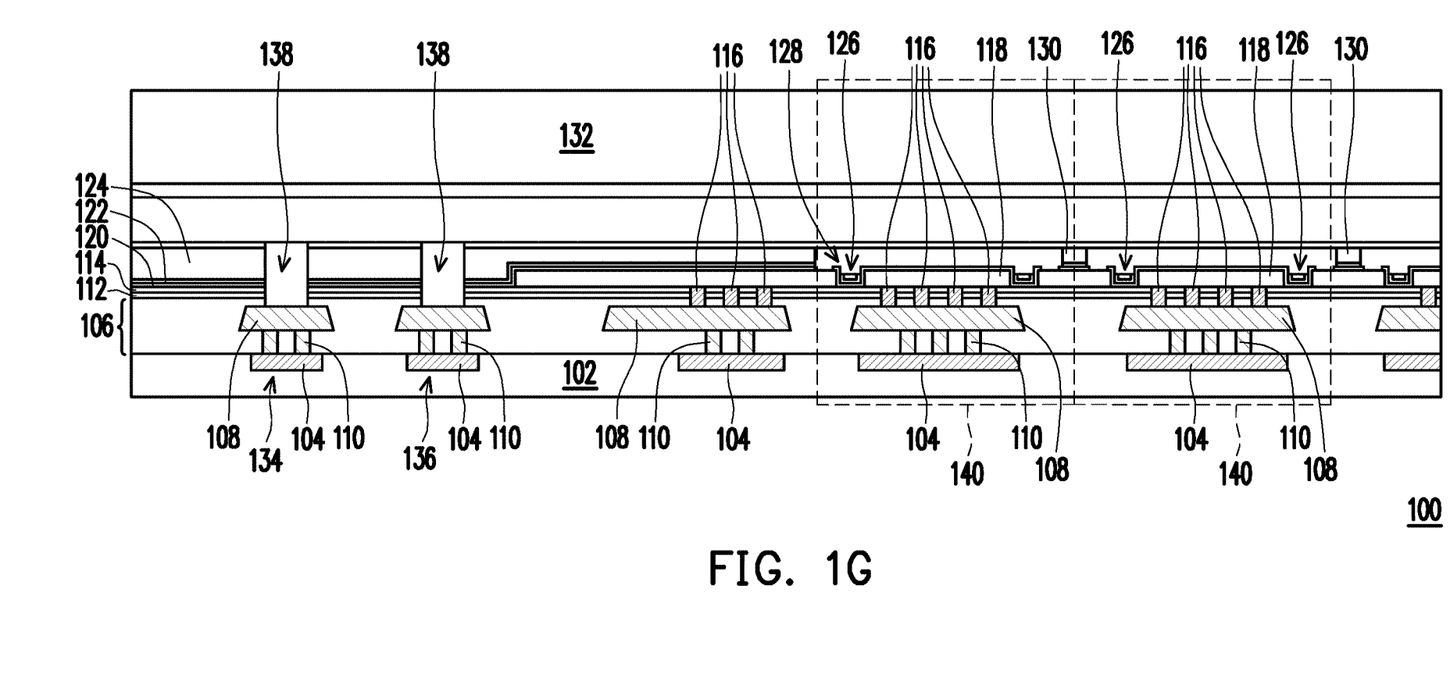

Referring now to FIGS. 1A-1G, there are shown cross-sectional views of various stages of a method of manufacturing a semiconductor device 100 comprising a plurality of CMUT units 140 in accordance with one embodiment. FIGS. 1A-1F illustrate formation of various components of the semiconductor device 100 contained within a CMUT unit 140, and FIG. 1G illustrates the semiconductor device 100 with the CMUT units 140 formed via the bonding of an integrated circuit substrate 102 to a carrier wafer 132 in accordance with some embodiments.

Turning now to FIG. 1A, an integrated circuit substrate 102 having one or more conductive components 104 disposed therein is shown. In accordance with one embodiment, substrate 102 is an integrated circuit substrate, such as a complimentary metal-oxide semiconductor ("CMOS") substrate and the one or more conductive components 104 are components of a CMOS circuit. In such an embodiment, the one or more conductive components 104 correspond to integrated circuit ("IC") components that are disposed on or over the CMOS substrate 102. Suitable examples of such IC components may include, for example and without limitation, active components (e.g., transistors), passive components (e.g., capacitors, inductors, resistors, and the like), or combinations thereof.

The semiconductor device 100 of FIG. 1A further illustrates a plurality of conductive lines or pads 108 disposed within a first dielectric layer 106 formed on the substrate 102. In some embodiments, the conductive pads 108 are implemented as Al—Cu pads. As depicted in FIG. 1A, the plurality of conductive lines or pads 108 are electrically coupled to respective conductive components 104 using one or more first vias 110. In accordance with one embodiment, the first vias 110 and the conductive pads 108 are formed from the same conductive material, i.e., AlCu. In other embodiments, the conductive material may comprise, for example and without limitation, a metal (e.g., titanium, tungsten, silver, gold, aluminum, copper, or alloys thereof), metal nitride, or any suitable combination thereof. In some embodiments, the pads 108 and the first vias 110 may be patterned simultaneously or sequentially. The conductive components 104, and/or conductive lines or pads 108 may be deposited by, for example, chemical vapor deposition (CVD), physical vapor deposition (PVD), atomic layer deposition (ALD), electroless plating, electrochemical plating, sputtering, ion metal plasma, another deposition process, or any suitable combination thereof. In some embodiments, the pads 108 may be exposed through the first dielectric layer 106, e.g., a top surface of the pads 108 is uncovered with respect to the first dielectric layer 106. In other embodiments, the top surface of the pad 108 may be covered by the first dielectric layer 106.

The first dielectric layer 106 may be deposited as a suitable dielectric oxide, as will be appreciated by those skilled in the art. Suitable examples of the first dielectric layer 106 may include, for example and without limitation, an oxide (e.g., $SiO_2$), a nitride (e.g., SiN), an oxy-nitride (e.g., $SiO_XN_Y$), some other dielectric material, or any suitable combination thereof. The first dielectric layer 106 may be deposited, for example and without limitation, by CVD, PVD, ALD, some other deposition process, or any suitable combination thereof. In accordance with one embodiment, the image depicted in FIG. 1A corresponds to redistribution layer formation and passivation processing of the semiconductor device 100, as will be understood by those skilled in the art.

FIG. 1B provides an illustration of the formation of sensing vias 116 during the production of the semiconductor device 100 in accordance with one embodiment. As shown in FIG. 1B, a second dielectric layer 112 and a third dielectric layer 114 are deposited on the semiconductor device 100. In some embodiments, the second dielectric layer 112 comprises a suitable nitride material, such as, for example and without limitation, a silicon nitride material. The third dielectric layer 114 may comprise, for example and without limitation, an oxide (e.g., $SiO_2$), a nitride (e.g., SiN), an oxy-nitride (e.g., $SiO_XN_Y$), some other dielectric material, or any suitable combination thereof. It will be appreciated that the first, second, and third dielectric layers 106, 112, and 114 may comprise the different dielectric materials, two layers may be the same and the remaining layer different, or the like. The second and third dielectric layers 112 and 114, respectively, may be deposited by, for example and without limitation, CVD, PVD, ALD, some other deposition process, or a suitable combination thereof. In varying embodiments, each layer 112 and 114 may be deposited via different processes, in different process chambers, or using the same deposition process, as will be understood in the art. More generally, at least one bottom dielectric layer 112, 114 is deposited on top of the first dielectric layer 106 and the conductive lines or pads 108.

As shown in FIG. 1B, a plurality of sensing vias 116 are formed in the second and third dielectric layers 112, 114 (or, more generally, the at least one bottom dielectric layer 112, 114), passing into the first dielectric layer 106 contacting the conductive lines/pads 108. Suitable examples of such sensing vias 116 materials include, for example and without limitation, a metal (e.g., Al, Cu, AlCu, Ti, Ag, Au, W, or the like), a metal nitride (e.g., TiN), some other conductive material, or any suitable combination thereof. It will be appreciated that the sensing vias 116 may be deposited by, for example and without limitation, CVD, PVD, ALD, electroless plating, electrochemical plating, sputtering, ion metal plasma, another deposition process, or any suitable combination thereof.

FIG. 1C illustrates the deposition and patterning of a bottom/sensing electrode 118 on the semiconductor device 100 in accordance with one embodiment. In the illustrative embodiment, the at least one sensing electrode 118 is a bottom electrode of a capacitive micromachined ultrasonic transducer unit. As shown in FIG. 1C, the bottom/sensing electrode 118 is patterned prior to the patterning (deposition and etching) of the dielectric films 120-124 (shown in FIG. 1D). The sensing electrode 118 is deposited on top of the at least one bottom dielectric layer 112, 114 (hence referring to the second and third dielectric layers 112, 114 as "bottom" dielectric layers). The sensing electrode 118 is patterned on the third dielectric layer 114 over the sensing vias 116 and in contact therewith. In accordance with varying embodiments contemplated herein, the sensing electrode 118 may comprise, for example and without limitation titanium (Ti) or other metal (e.g., Al, Cu, AlCu, Ag, Au, W, or the like), a metal nitride (e.g., titanium nitride (TiN), another conductive material, or suitable combinations thereof. The bottom/sensing electrode 118 may be deposited by, for example and without limitation, CVD, PVD, ALD, electroless plating, electrochemical plating, sputtering, ion metal plasma, another deposition process, or any suitable combination thereof.

FIG. 1D illustrates the deposition and subsequent patterning of at least one top dielectric film, and in the illustrative embodiment three dielectric films (the dielectric films 120, 122, and 124) which are deposited and patterned after the patterning of the bottom/sensing electrode 118 on the semiconductor device 100 in accordance with one embodiment. The dielectric films 120, 122, 124 are referred to as "top" dielectric layers because they are deposited on top of the bottom/sensing electrode 118. As shown in FIG. 1D, in the illustrative example a fourth dielectric film 120 is deposited on the already patterned bottom/sensing electrode 118. According to one embodiment, the fourth dielectric film 120, as shown in FIG. 1D, fully covers the bottom/sensing electrode 118. That is, the previously formed bottom/sensing electrode 118 is fully encapsulated by at least one top dielectric layer, e.g., film 120, covering the sides and top of the bottom/sensing electrode 118. A fifth dielectric layer 122 is then deposited on the fourth dielectric film 120, followed by the deposition of a sixth dielectric film 124 thereupon. It will be appreciated by those skilled in the art that while shown as three separate layers 120-124, the fourth through sixth dielectric layers 120, 122, 124 may be combined into a single layer, into two layers, and the like. Further, it will be appreciated that the composition of the dielectric layers 120, 122, and 124 may be of different materials, or one different and two similar. It will be appreciated by those skilled in the art that the fourth, fifth, and sixth dielectric layers 120, 122, and 124 may be deposited, for example and without limitation, by CVD, PVD, ALD, some other deposition process, or any suitable combination thereof.

In the example embodiment illustrated in FIG. 1D, the fourth dielectric layer 120 comprises an atomic layer deposited oxide material (ALD Ox), the fifth dielectric layer 122 comprises a nitride material (e.g., a SiN material), and the sixth dielectric layer 124 comprises an oxide material (e.g., $SiO_2$). Also illustrated in FIG. 1D are a plurality of isolation trenches 126, located adjacent the bottom/sensing electrodes 118 and filled with the fourth through sixth dielectric layers 120, 122, 124. The skilled artisan will appreciate that isolation trenches 126 provide protection from electric current leakage between the various conductive components, i.e., the bottom/sensing electrodes 118 in accordance with one embodiment contemplated herein.

FIG. 1E illustrates the chemical mechanical planarization ("CMP") of the semiconductor device 100 in accordance with one embodiment. As shown in FIG. 1D, the deposition of the sixth dielectric film 124 results in an uneven surface of the semiconductor device 100, denoted particularly by the raised portions above the bottom/sensing electrode 118. As depicted in FIG. 1E, the semiconductor device 100 has been subjected to suitable planarization, i.e., polishing, to remove excess material from the sixth dielectric film 124. The skilled artisan will appreciate that the CMP may be performed to remove a portion of the sixth dielectric film 124 in preparation for additional patterning. The resulting planarization of the semiconductor device 100 from the CMP process is accordingly depicted in FIG. 1E.

Turning now to FIG. 1F, there is shown an illustration of the additional patterning of one or more cavities 128 on the semiconductor device 100 in accordance with one embodiment. As shown in FIG. 1F, a portion of the fifth dielectric film 122 and the sixth dielectric film 124 deposited in FIG. 1F and subsequently planarized in FIG. 1E is removed (i.e., patterned, etched, etc.) from the semiconductor device 100 to expose the isolation trenches 126 and the fourth dielectric layer 120 covering the bottom/sensing electrode 118. In this manner, a cavity 128 is formed in the fifth and sixth dielectric layers 122, 124, exposing the bottom/sensing electrode 118 (fully encapsulated/covered by the dielectric film 120) as shown in FIG. 1F.

Alternatively, in some embodiments, a process for forming the cavities 128 comprises forming a patterned masking layer (not shown) (e.g., positive/negative photoresist, hardmask, etc.) over the sixth dielectric layer 124, over the bottom/sensing electrode 118, and the trenches 126. Thereafter, an etching process is performed to remove unmasked portions of the sixth dielectric layer 124 exposing the fifth dielectric layer 122. The masking layer may be removed and then a second masking layer is patterned to enable removal of a portion of the fifth dielectric layer 122 from a portion of the trenches and above the bottom/sensing electrodes 118, thereby forming the cavities 128. The etching process may be a dry etching process, a RIE process, a wet etching process, some other etching process, or a combination of the foregoing. Subsequently, in some embodiments, the patterned masking layer is stripped away.

Alternatively, in some embodiments, a single masking and etching process may be used, to remove portions of the sixth dielectric layer 124 and fifth dielectric layer 122 over the trenches 126 and bottom/sensing electrodes 118. As illustrated in FIG. 1F, the fourth dielectric layer 120 suitably remains over the bottom/sensing electrodes 118 and lines the isolation trenches 126. Further, a portion of the fifth dielectric layer 122 and the sixth dielectric layer 124 remains in the isolation trenches 126, as more clearly illustrated in FIG. 2, discussed below.

In accordance with one embodiment, a pressure port 130 is positioned between adjacent bottom/sensing electrodes 118 and their respective cavities 128, as will be appreciated by those skilled in the art. In some embodiments, the pressure ports 130 may extend vertically to be in fluid communication with the cavities 128 and may be utilized to control, adjust, create, or otherwise affect pressure inside the cavities 128 after or during the bonding of the semiconductor device 100 with a carrier wafer 132 (i.e., capping wafer or the like), as shown in FIG. 1G.

Turning now to FIG. 1G, there is shown an illustration of a side view of the bonding of the semiconductor device 100 with a corresponding carrier wafer 132 in accordance with one embodiment. As depicted in FIG. 1G, the bonded semiconductor device 100 includes openings 138 located above the conductive components/IC components 104. In some embodiments, the semiconductor device 100 may be bonded to the carrier wafer 132 using a fusion bonding process. The skilled artisan will appreciate that other types of bonding processes may be used to join the semiconductor device 100 with the carrier wafer 132, including for example and without limitation, eutectic bonding.

In the illustration of FIG. 1G, the first conductive/IC component 104 may correspond to a CMOS/MEMS input/output component 134, and the second conductive/IC component 104 may correspond to a CMOS/MEMS interconnect component 136 (e.g., interconnects the various IC components 104 together in a predefined pattern). As shown, the openings 138 may extend from the conductive pads/lines 108 through the first dielectric layer 106, the second dielectric layer 112, the third dielectric layer 114, the fourth dielectric layer 120, the fifth dielectric layer 122, and the sixth dielectric layer 124. It will be appreciated that formation of these openings 138 may be accomplished via etching (dry or wet). That is, the openings 138 may be generated by forming a patterned masking layer (not shown) (e.g., positive/negative photoresist, hardmask, etc.) over the sixth dielectric layer 124. Thereafter, an etching process is performed to remove unmasked portions of the sixth dielectric layer 124, and subsequent dielectric layers 106, 112, 114, 120, and 122 as illustrated in FIG. 1G, thereby forming the openings 138. The aforementioned etching process may be a dry etching process, a RIE process, a wet etching process, some other etching process, or a combination of the foregoing. Subsequently, in some embodiments, the patterned masking layer is stripped away. Also illustrated in FIG. 1G are CMUT units 140, which are illustrated and discussed in greater detail below. It will be appreciated that the semiconductor device 100 includes a plurality of CMUT units 140, and the illustrations provided in FIGS. 1A-1G are intended to shown a portion thereof for example purposes only.

Figure 2:
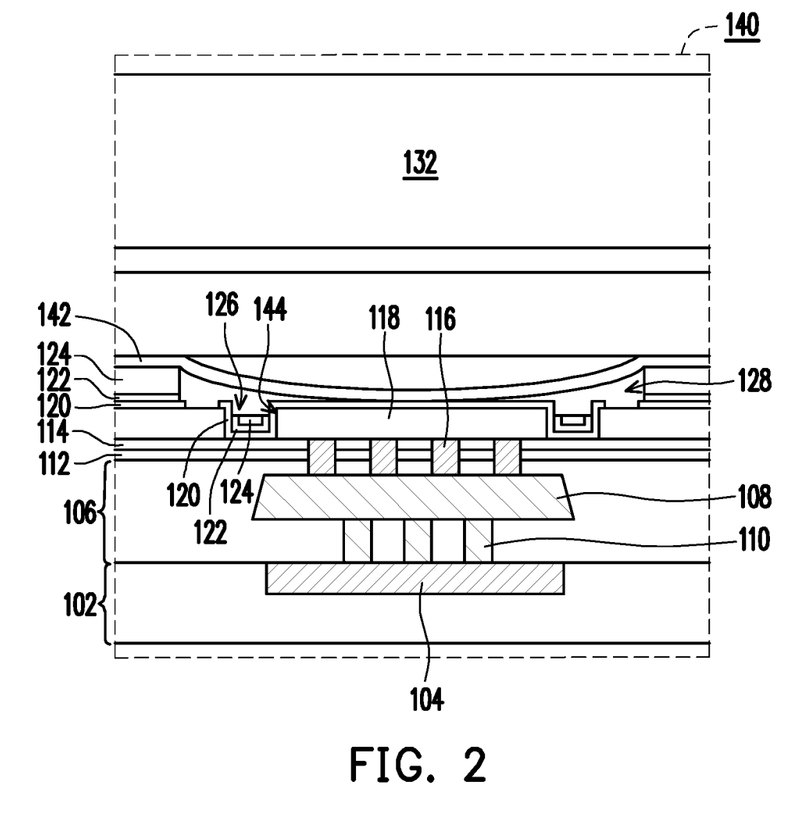
FIG. 2 illustrates a cross-sectional view of a CMUT unit having bottom electrode protection in accordance with some embodiments.

Turning now to FIG. 2, there is shown a CMUT unit 140 in accordance with the patterning of the bottom/sensing electrode 118 prior to the dielectric layers 120, 122, 124 of one embodiment. The CMUT unit 140 includes a membrane 142 illustrated as distinct from the carrier wafer 132 for illustration purposes. In accordance with some embodiments, the membrane 142 is configured to move or clap (e.g., flex, vibrate, etc.) in response to one or more stimuli (e.g., pressure, voltage, etc.). The detailed view in FIG. 2 illustrates the presence of the fourth, fifth and sixth dielectric layers 120, 122, 124 in the isolation trench 126 and adjacent to the side 144 of the bottom/sensing electrode 118.

During operation of the CMUT unit 140, the membrane 142 claps or vibrates in response to the aforementioned stimuli. When this occurs, the membrane 142 contacts the fourth dielectric layer 120 disposed over the bottom/sensing electrode 118. As shown in FIG. 2, the sidewalls 144 of the bottom/sensing electrode 118 are highly protected by the presence of the fourth, fifth and sixth dielectric layers 120-124 (visible in the isolation trench 126) in accordance with the "patterning first" of the bottom/sensing electrode 118 as discussed above with respect to FIGS. 1A-1G. That is, as shown in FIG. 2, the bottom/sensing electrode 118 is fully covered (top and sidewalls 144) by at least one dielectric layer 120-124. It will be appreciated that the absence of this protection, i.e., without the dielectric films 120-124 in the isolation trench 126 and the sidewalls 144 of the bottom/sensing electrode 118 as shown in embodiment of FIG. 2, charging can accumulate at the corner/sidewall 144 of the bottom/sensing electrode 118, resulting in failure of the CMUT unit 140.

Figure 3:
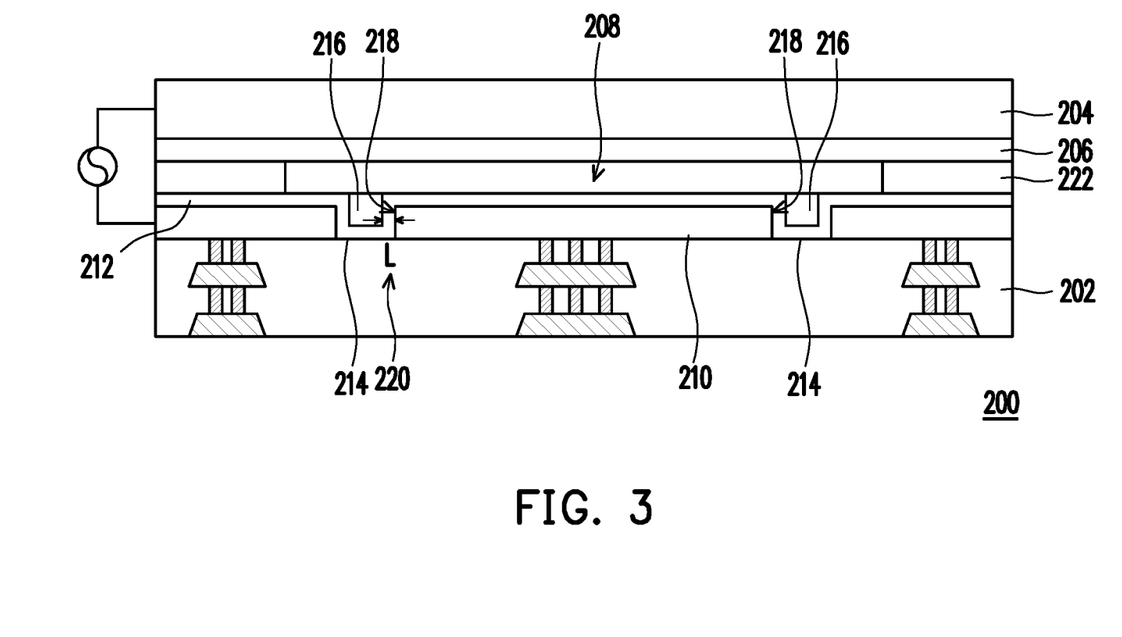
FIG. 3 illustrates a simplified cross-sectional view of a CMUT unit having bottom electrode protection in accordance with some embodiments.
Figure 4:
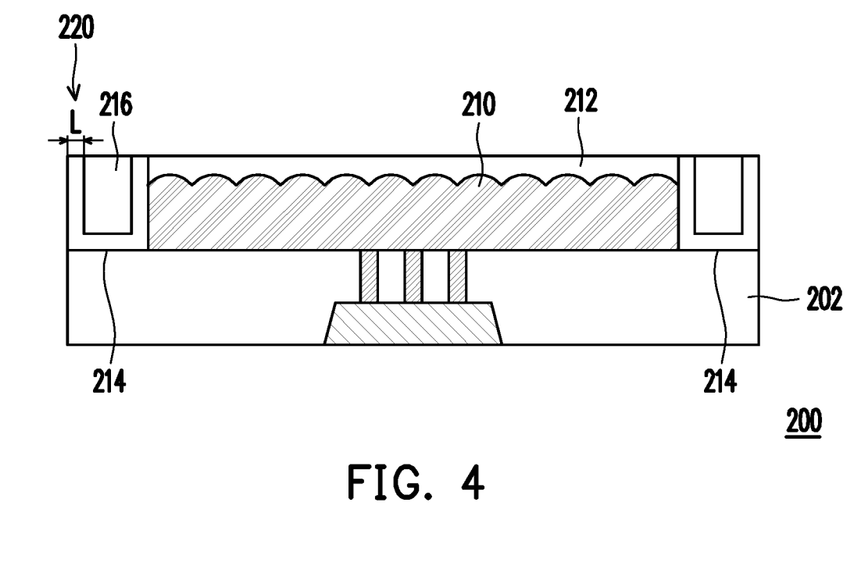
FIG. 4 illustrates a simplified close-up view of the bottom electrode of the CMUT unit of FIG. 3.

Referring now to FIGS. 3 and 4, there is shown a simplified side view of a CMUT unit 200 produced in accordance with the bottom/sensing electrode 118 "patterning first" process as discussed above in FIGS. 1A-1G. As shown in FIG. 3, the CMUT unit 200 includes a device substrate 202 and a membrane 204 bonded together along a bonding surface 206. In some embodiments, the device substrate 202 and the membrane 204 may be bonded via fusion bonding, adhesive bonding, or the like. The interface of the device substrate 202 and the membrane 204 is illustrated in FIG. 3 as the bonding surface 206. The skilled artisan will appreciate that the CMUT unit 200 illustrated in FIG. 3, the membrane 204 is implemented as a carrier wafer, e.g., a silicon membrane. A cavity 208 is formed between the bonded substrate 202 and membrane 204, in which is disposed a bottom/sensing electrode 210. Present at either end of the cavity 208 shown in FIG. 3 are cavity dielectric components 222, which may be implemented as a suitable dielectric material, e.g., an oxide material. A dielectric film 212 is located on the top and sidewalls of the bottom/sensing electrode 210. Surrounding the bottom/sensing electrode 210 is an isolation trench 214 having the dielectric film 212 disposed therein. The isolation trench 214 further includes a dielectric material 216 filling the trench 214 and deposited adjacent the dielectric film 212.

The dielectric film 212 deposited on the bottom/sensing electrode 210 is configured to prevent charging of the membrane 204 during operations of the CMUT unit 200. To facilitate this protection, as indicated above with respect to FIGS. 1A-2, the bottom/sensing electrode 210 is patterned first, after which the dielectric film 212 is patterned. The aforementioned charging may occur along a side wall 218 of the bottom/sensing electrode 210, which is alleviated in embodiments disclosed herein. In accordance with one embodiment, as illustrated in FIG. 4, the bottom/sensing electrode 210 has a predetermined surface roughness (Ra) dependent upon the type of deposition process used to deposit the bottom/sensing electrode 210 which corresponds to the thickness "L" 220 of the dielectric film 212. For example and without limitation, when the bottom/sensing electrode 210 comprises a metal, e.g., titanium, and is deposited via ion metal plasma, the bottom/sensing electrode 210 may have a surface roughness of approximately 100 angstroms. In response thereto, the dielectric film 212 may have a thickness L 220 in the range of 150 to 300 Angstroms, and may be greater than 200 angstroms thick. In another example, using titanium as the bottom/sensing electrode 210 deposited via sputtering, may have a surface roughness of approximately 30 angstroms. In such an example, the dielectric film 212 may have a thickness L 220 in the range of 50 to 80 angstroms, and may be greater than 60 angstroms thick. In accordance with other embodiments contemplated herein, the thickness L 220 of the dielectric film 212 may be greater than two times the surface roughness of the bottom/sensing electrode 210. It will be appreciated that the thickness L 220 of the dielectric film 212 having greater than two times the surface roughness (Ra) of the bottom electrode 210 provides substantial coverage of the bottom/sensing electrode 210, including, without limitation, coverage of the corners of the electrode. Further, it will be appreciated that the thickness L 220 of the dielectric film 212 having greater than two times the surface roughness (Ra) of the bottom electrode 210 provides better adhesion of the dielectric film 212 to the bottom electrode 210.

Figure 5:
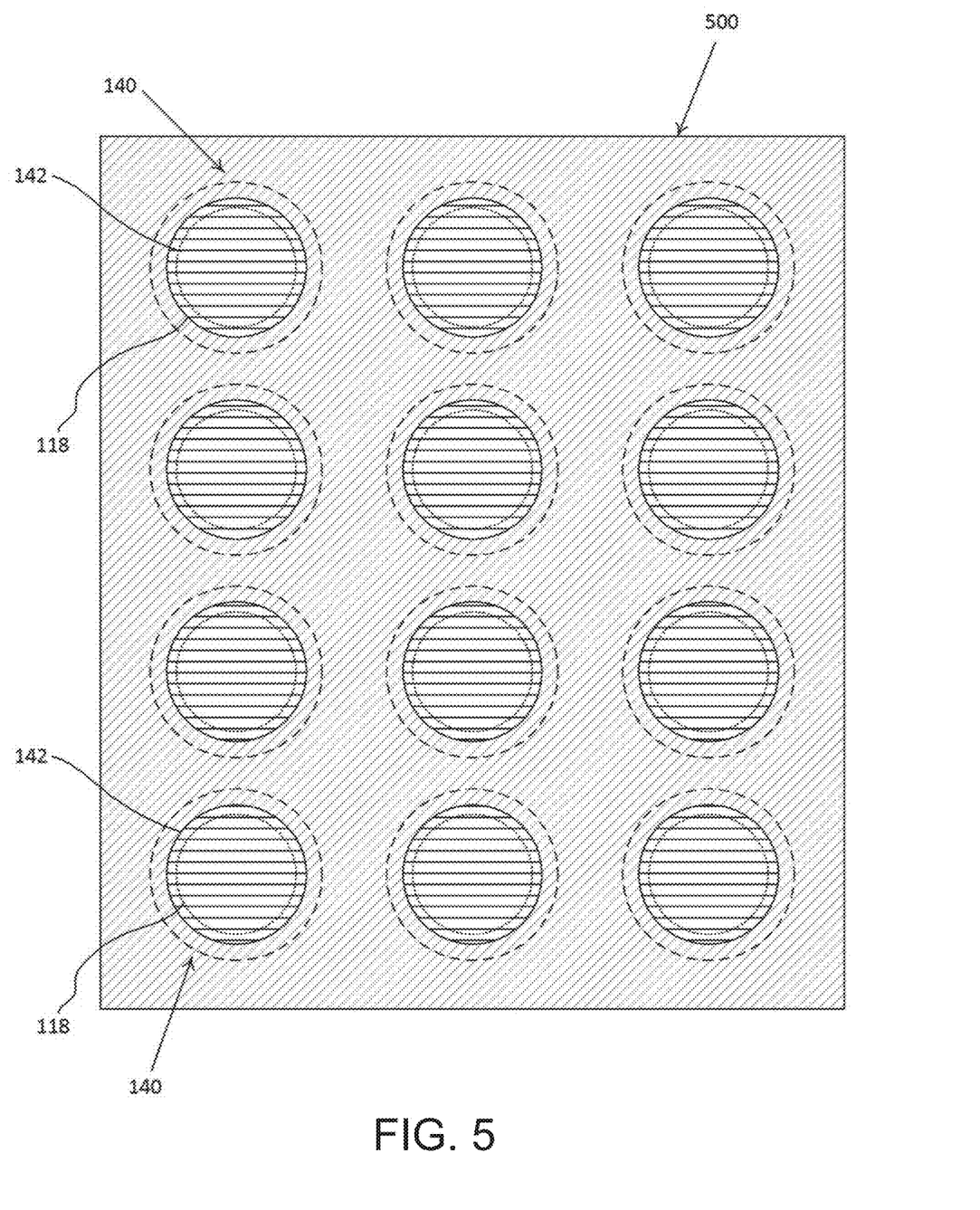
FIG. 5 illustrates a simplified layout view of some embodiments of the CMUT units of FIGS. 1A-5.

Turning now to FIG. 5, there is depicted a simplified layout view of a plurality of CMUT units 140 forming a MEMS device 500 fabricated in accordance with the processes described above. It will be appreciated that the top view illustrated in FIG. 5 does not include all elements depicted in the views presented above with respect to FIGS. 1A-4.

As shown in FIG. 5, the MEMS device 500 includes a plurality of CMUT units 140, which include a corresponding plurality of cavities 128. It will be appreciated that each CMUT unit 140 of the MEMS device 500 will generally comprise similar cavities in size and shape. The plurality of CMUT units 140 further include a corresponding plurality of membranes 142. In some embodiments, each of the plurality of membranes 142 have substantially similar structures and compositions.

In varying embodiments, each of the CMUT units 140 include a bottom/sensing electrode 118 positioned within the CMUT unit 140 and operable to interact with the membrane 142. In some embodiments, the plurality of CMUT units 140 are configured to operate in conjunction with one another (e.g., in unison). For example, the MEMS device 500 may be a CMUT, and the plurality of units 140 are individual cells of the CMUT. In further embodiments, during operation of the MEMS device 500, a same operating voltage may be applied to each of the plurality of CMUT units 140. It will be appreciated by those skilled in the art that while depicted in FIG. 5 as being circular in shape, the CMUT units 140 may be quadrilateral, polygonal, bar shaped, ring shaped, or the like, and the illustration in FIG. 5 is intended solely as an example of one embodiment.

Figure 6:
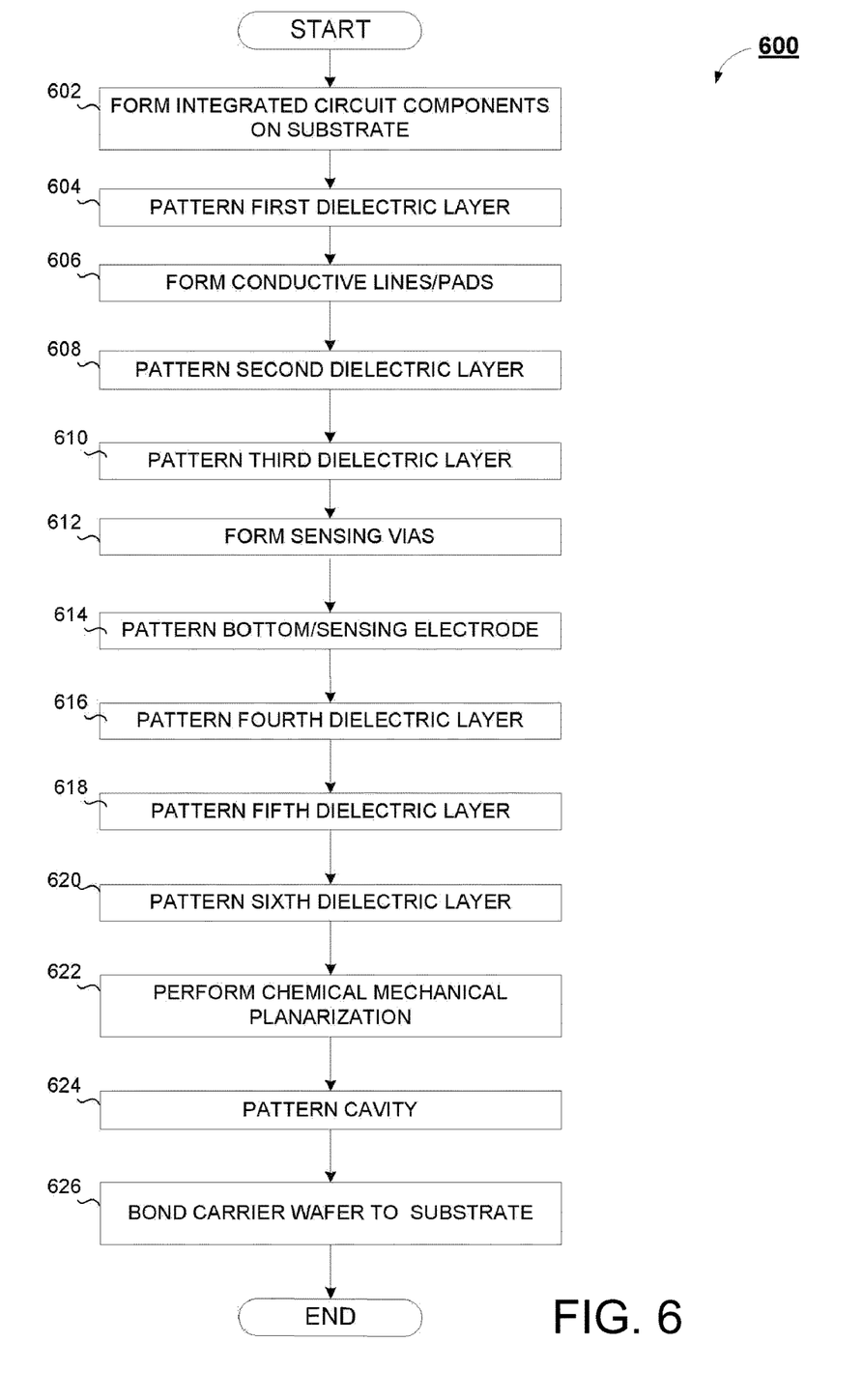
FIG. 6 illustrates a method for bottom/sensing electrode "patterning first" fabrication of a semiconductor device in accordance with some embodiments.

Turning now to FIG. 6, there is shown a flow chart illustrating a method 600 for bottom/sensing electrode patterning first fabrication of a CMUT MEMS device in accordance with one embodiment. The method 600 begins at step 602, whereupon one or more integrated circuit components 104 are formed on a CMOS substrate 102. It will be appreciated by those skilled in the art that the integrated circuit components 104 may be or comprise, for example and without, active electronic devices (e.g., transistors), passive electronic devices (e.g., resistors, capacitors, inductors, fuses, etc.), some other electronic devices, or a combination thereof. Formation of these integrated circuit components 104 may be accomplished in accordance with suitable deposition, etching, etc., processes as will be appreciated by those skilled in the art.

At step 604, a first dielectric layer 106 is formed on the substrate 102. In some embodiments, the first dielectric layer 106 may be a dielectric oxide (e.g., $SiO_2$), a nitride (e.g., SiN), an oxy-nitride (e.g., $SiO_XN_Y$), some other dielectric material, or any suitable combination thereof. The first dielectric layer 106 may be deposited, for example and without limitation, by CVD, PVD, ALD, some other deposition process, or any suitable combination thereof.

At step 606, a plurality of conductive lines or pads 108 and first vias 110 are formed on the substrate 102. In accordance with one embodiment, the first vias 110 and the conductive pads 108 are formed from the same conductive material, i.e., AlCu. In other embodiments, the conductive material may comprise, for example and without limitation, a metal (e.g., titanium, tungsten, silver, gold, aluminum, copper, or alloys thereof), metal nitride, or any suitable combination thereof. In some embodiments, the pads 108 and the first vias 110 may be patterned simultaneously or sequentially. The conductive components 104, and/or conductive lines or pads 108 may be deposited by, for example, CVD, PVD, ALD, electroless plating, electrochemical plating, sputtering, ion metal plasma, another deposition process, or any suitable combination thereof. These two steps are illustrated in FIG. 1A.

At step 608, a second dielectric layer 112 is deposited on the first dielectric layer 106. In some embodiments, the second dielectric layer 112 comprises a suitable nitride material, such as, for example and without limitation, a silicon nitride material.

At step 610, a third dielectric layer 114 is deposited on the second dielectric layer 112. The third dielectric layer 114 may comprise, for example and without limitation, an oxide (e.g., $SiO_2$), a nitride (e.g., SiN), an oxy-nitride (e.g., $SiO_XN_Y$), some other dielectric material, or any suitable combination thereof.

At step 612, a plurality of sensing vias 116 are formed on the conductive lines/pads 108, through the second and third dielectric layers 112, 114. In some embodiments, a patterned masking layer (e.g., positive/negative photoresist, hardmask, etc.) may be layered over the third dielectric layer 114, patterning mask. In further embodiments, the patterned masking layer may be formed by forming a masking layer on the third dielectric layer 114, exposing the masking layer to a pattern (e.g., via a lithography process, such as photolithography, extreme ultraviolet lithography, or the like), and developing the masking layer to form the patterned masking layer. Thereafter, an etching process is performed to remove unmasked portions of the third dielectric layer 114 and the second dielectric layer 112, thereby forming openings therethrough over the conductive pads/lines 108. The aforementioned etching process may be a dry etching process, a wet etching process, a reactive ion etching (RIE) process, some other etching process, or a combination of the foregoing. The sensing vias 116 may then be deposited via any suitable means and the aforementioned patterned masking layer is stripped away.

In accordance with another embodiment, steps 608, 610, 612 may be performed in an alternate manner, wherein the material for the sensing vias 116 is deposited first, then a patterning mask is formed protecting the desired sensing vias 116, followed by etching to remove the undesired sensing via material. Thereafter, deposition of the second and third dielectric layers 112, 114, may be performed as discussed above. The photoresist protecting the sensing vias 116 is then removed resulting in the image provided in FIG. 1B.

After formation of the sensing vias 116, operations proceed to step 614, whereupon bottom/sensing electrodes 118 are patterned on the second dielectric layer 114 and in contact with the sensing vias 116. That is, a patterned masking layer (i.e., positive/negative photoresist, hardmask, etc.) is formed over the third dielectric layer 114. The bottom/sensing electrodes 118 are then deposited via photoresist or other masking component is deposited by, for example and without limitation, CVD, PVD, ALD, electroless plating, electrochemical plating, sputtering, ion metal plasma, another deposition process, or any suitable combination thereof. According to one embodiment, the bottom/sensing electrode 118 may comprise titanium deposited via ion metal plasma deposition at a thickness in the range of 80 to 110 angstroms. According to another embodiment, the bottom/sensing electrode 118 may comprise titanium deposited via sputtering deposition at a thickness in the range of 15 to 40 angstroms. In other embodiments, the bottom/sensing electrode 118 may comprise, for example and without limitation, Al, Cu, AlCu, Ag, Au, W, or the like, a metal nitride (e.g., TiN), or other conductive material. Subsequently, in some embodiments, the patterned masking layer is stripped away, resulting in the patterned first bottom/sensing electrodes 118 as illustrated in FIG. 1C.

At step 616, a fourth dielectric layer 120 is deposited on the third dielectric layer 114 and bottom/sensing electrodes 118. In accordance with one embodiment, the fourth dielectric layer 120 comprises an oxide material that is deposited via atomic layered deposition (ALD). In accordance with one embodiment, the fourth dielectric layer 120 fully covers (e.g., encapsulates) the top and sidewalls of the previously patterned bottom/sensing electrodes 118, as shown in FIG. 1D.

A fifth dielectric layer 122 is then deposited over the fourth dielectric layer 120 at step 618. In accordance with one exemplary embodiment, the fifth dielectric layer 122 comprises a nitride material, e.g., a SiN material, or the like.

Thereafter, a sixth dielectric layer 124 is deposited on the fifth dielectric layer 122 at step 620. According to one exemplary embodiment, the sixth dielectric layer 124 comprises an oxide material, e.g., $SiO_2$ or the like. FIG. 1D provides an illustrative example of the semiconductor device 100 after completion of steps 616, 618, and 620.

Operations for the fabrication of the semiconductor device 100 then proceed to step 622, whereupon chemical mechanical planarization (CMP) is performed so as to remove excess portions of the sixth dielectric layer 124, as illustrated in FIG. 1E. on the semiconductor device 100.

At step 624, cavities 128 are formed over the bottom/sensing electrodes 118 and isolation trenches 126. That is, a patterned masking layer (e.g., positive/negative photoresist, hardmask, etc.) may be formed over the sixth dielectric layer 124, leaving exposed the sixth dielectric layer 124 over the bottom/sensing electrodes 118 and the trenches 126. Thereafter, an etching process is performed to remove portions of the unmasked sixth dielectric layer 124 and the fifth dielectric layer 122, thereby forming the cavities 128 and exposing the trenches 126. The etching process may be a dry etching process, a RIE process, a wet etching process, some other etching process, or a combination of the foregoing. Thereafter, the patterned masking layer is stripped away. The result is shown in FIG. 1F.

In some embodiments, a second masking and etching process may be used, i.e., when the fifth dielectric layer 122 remains after the first masking/etching process to remove portions of the sixth dielectric layer 124 over the trenches 126 and bottom/sensing electrodes 118. As illustrated in FIG. 2, the fourth dielectric layer 120 suitably remains over the bottom/sensing electrodes 118 and lines the isolation trenches 126, and a portion of the fifth dielectric layer 120 and a portion of the sixth dielectric layer 124 remain in the isolation trenches 126, as illustrated in FIGS. 1F and 2. Accordingly, the skilled artisan will appreciate that one or more masks and etching processes may be used to form the cavities 128 of the semiconductor device 100.

It will further be appreciated that the thickness of the fourth dielectric layer 120 lining the bottom/electrode 118 wall 144 is dependent upon the aforementioned surface roughness of the bottom/electrode 118. Thus, for example and without limitation, when the bottom/sensing electrode 118 comprises titanium that is deposited via ion metal plasma, the fourth dielectric film 120 may have a thickness L in the range of 150 to 300 angstroms, and may be greater than 200 angstroms thick. In another example, using titanium as the bottom/sensing electrode 118 deposited via sputtering, the fourth dielectric film 120 may have a thickness L in the range of 50 to 80 angstroms, and may be greater than 60 angstroms thick.

In accordance with some embodiments disclosed herein, one or more pressure ports 130 positioned between adjacent bottom/sensing electrodes 118 and their respective cavities 128, may be patterned/formed at 624 or subsequent thereto. In such embodiments, the pressure ports 130 may extend vertically to be in fluid communication with the cavities 128 and may be utilized to control, adjust, create, or otherwise affect pressure inside the cavities 128 after or during the bonding of the semiconductor device 100 with a carrier wafer 132 (i.e., capping wafer or the like), as shown in FIG. 1G.

At step 626, the semiconductor device 100 comprising a plurality of CMUT units 140 is formed by bonding of the integrated circuit substrate 102 to a carrier wafer 132. In some embodiments, the semiconductor device 100 may be bonded to the carrier wafer 132 using a fusion bonding process. The skilled artisan will appreciate that other types of bonding processes may be used to join the semiconductor device 100 with the carrier wafer 132, including for example and without limitation, eutectic bonding, or the like. The result is shown in FIG. 1G.

In accordance with a first embodiment, there is provided a method of manufacturing a semiconductor device. The method includes patterning, on an integrated circuit substrate, a first dielectric layer, the integrated circuit substrate having a plurality of conductive components associated therewith. The method further includes forming a plurality of sensing vias through the first dielectric layer, a second dielectric layer, and a third dielectric layer interconnecting with at least one of the plurality of conductive components. At least one sensing electrode is then patterned on the third dielectric layer in electrical communication with at least one of the plurality of sensing vias. A plurality of dielectric layers are then patterned on the substrate subsequent to the patterning of the at least one sensing electrode, including a fourth dielectric layer on the integrated substrate, wherein the fourth dielectric layer is patterned over the at least one sensing electrode, a fifth dielectric layer on the fourth dielectric layer, and a sixth dielectric layer on the fifth dielectric layer. At least one cavity is then patterned on the integrated circuit substrate, wherein the at least one cavity includes the at least one sensing electrode disposed therein. Thereafter, the method includes bonding a carrier wafer to the integrated substrate.

In accordance with a second embodiment, there is provided a semiconductor device that comprises a carrier wafer having at least one membrane, and an integrated circuit substrate bonded to the carrier wafer. The integrated circuit substrate includes a plurality of conductive components disposed within a first dielectric layer on the substrate, the plurality of conductive components interconnected with a respective plurality of integrated circuit components. The substrate further includes a second dielectric layer disposed above the first dielectric layer, and a third dielectric layer disposed above the second dielectric layer. The integrated circuit substrate also includes a plurality of sensing vias that are positioned above at least one of the conductive components and electrically coupled thereto through the second and third dielectric layers. The substrate further includes at least one sensing electrode positioned above and electrically coupled to at least one of the sensing vias, and a fourth dielectric layer that is disposed above the at least one sensing electrode. The substrate further includes a fifth dielectric layer disposed above at least a portion of the fourth dielectric layer, and a sixth dielectric layer disposed above the at least a portion of the fifth dielectric layer. The substrate further includes at least one cavity formed by the at least one membrane positioned over the at least one sensing electrode.

In accordance with a third embodiment, there is provided capacitive micromachined ultrasonic transducer (CMUT). The CMUT includes an integrated circuit substrate, and a sensing electrode positioned on the integrated substrate. The sensing electrode includes a sidewall that forms a wall of an isolation trench adjacent to the sensing electrode. The CMUT further includes a dielectric layer patterned on the sensing electrode and sidewall, and which has a thickness two times a surface roughness of the sensing electrode. The CMUT further includes a membrane positioned above the sensing electrode forming a cavity therein.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a carrier wafer comprising at least one membrane; and
an integrated circuit substrate bonded to the carrier wafer, the substrate comprising:
a plurality of conductive components disposed within a first dielectric layer on the substrate, the plurality of conductive components interconnected with a respective plurality of integrated circuit components;
a second dielectric layer disposed above the first dielectric layer;

a third dielectric layer disposed above the second dielectric layer, a plurality of sensing vias disposed above at least one of the plurality of conductive components and electrically coupled thereto through the second and third dielectric layers;

at least one sensing electrode disposed above and electrically coupled to at least one of the plurality of sensing vias, each sensing electrode including a sidewall forming a wall of an isolation trench adjacent to the sensing electrode and sidewall thereof;

a fourth dielectric layer patterned on the at least one sensing electrode and sidewall thereof having a thickness greater than two times a surface roughness of the sensing electrode;

a fifth dielectric layer disposed above at least a portion of the fourth dielectric layer;

a sixth dielectric layer disposed above the at least a portion of the fifth dielectric layer; and at least one cavity formed by the at least one membrane positioned over the at least one sensing electrode.

2. The semiconductor device of claim 1, wherein the isolation trench includes at least a portion of the fourth, fifth and sixth dielectric layers.

3. The semiconductor device of claim 1, wherein the fourth dielectric layer is in contact with at least one sensing electrode sidewall.

4. The semiconductor device of claim 1, wherein the at least one cavity inclusive of the at least one sensing electrode corresponds to a capacitive micromachined ultrasonic transducer unit.

5. The semiconductor device of claim 1, wherein the fourth dielectric layer is an atomic layer deposited oxide.

6. The semiconductor device of claim 1, wherein the isolation trench is covered by the fourth dielectric layer.

7. A capacitive micromachined ultrasonic transducer, comprising:

an integrated circuit substrate;

a sensing electrode positioned on the integrated circuit substrate, wherein the sensing electrode includes a sidewall forming a wall of an isolation trench adjacent the sensing electrode;

a dielectric layer patterned on the sensing electrode and sidewall thereof having a thickness greater than two times a surface roughness of the sensing electrode; and a membrane positioned above the sensing electrode forming a cavity therein.

8. The capacitive micromachined ultrasonic transducer of claim 7, wherein the dielectric layer is an atomic layer deposited oxide.

9. The capacitive micromachined ultrasonic transducer of claim 7, wherein the sensing electrode is comprised of at least one of a sputtering deposited titanium or an ion metal plasma deposited titanium.

10. The capacitive micromachined ultrasonic transducer of claim 7, wherein the sensing electrode is electrically coupled to a conductive component of the integrated substrate through at least one sensing via.

11. The capacitive micromachined ultrasonic transducer of claim 7, wherein the dielectric layer lines the isolation trench and a top surface of the sensing electrode.

12. The capacitive micromachined ultrasonic transducer of claim 11, wherein the isolation trench includes at least one additional dielectric layer having a different construction from the dielectric layer.

* * * * *